Feb. 16, 1932.   F. MENNINGHAUS   1,845,885
CLOTHESLINE ELEVATING DEVICE
Filed July 7, 1931
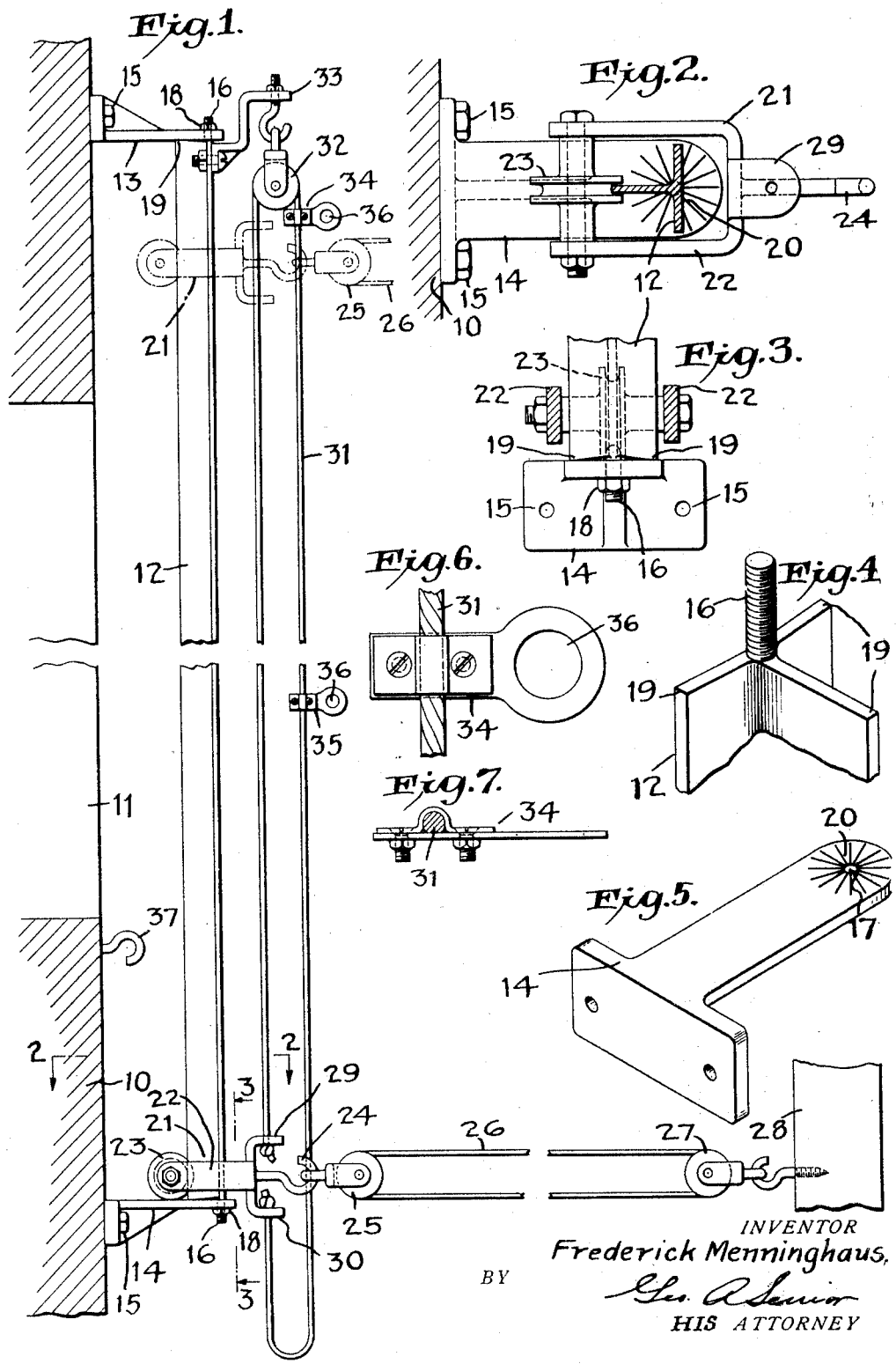
INVENTOR
Frederick Menninghaus,
BY
HIS ATTORNEY Patented Feb. 16, 1932

1,845,885

UNITED STATES PATENT OFFICE

FREDERICK MENNINGHAUS, OF CLIFTON, NEW JERSEY

CLOTHESLINE ELEVATING DEVICE

Application filed July 7, 1931. Serial No. 549,196.

The invention relates to clothes-line elevating devices and has for its principal object to provide a device of this character which is staunch in construction, simple and efficient in operation and economical to manufacture.

Numerous devices have been designed for this purpose, but as far as applicant is aware they are cumbersome, complicated and inefficient in operation, particularly in inclement weather.

A number of advantages will be pointed out hereinafter in the improved clothes-line elevating devices constructed in accordance with the present invention.

Referring to the drawings, in which a preferred embodiment of the invention is illustrated:

Fig. 1 is an elevational view of the device as installed on the side of a building, the intermediate part being broken away for economy of space;

Fig. 2 is a detail horizontal sectional view taken on line 2—2 of Fig. 1;

Fig. 3 is a fragmentary detail sectional view taken on line 3—3 of Fig. 1;

Fig. 4 is a detail perspective view of one end of the guide member;

Fig. 5 is a detail perspective view of one of the supporting brackets for the guide member;

Fig. 6 is a detail plan view of one of the clips used to hold the line in position; and Fig. 7 is an edge view of the clip.

The reference numeral 10 designates the side of a building and 11 the window opening. If desired, the device may be mounted on a pole or secured to a board or base which may be suitably fastened to any convenient structure.

A T-iron guide member 12 is supported at its upper and lower ends on brackets 13 and 14 which are secured by bolts or screws 15 to the side of the building. The ends of the T-iron guide member have threaded extensions 16 which pass through apertures 17 in the brackets 13 and 14 and are secured therein by nuts 18.

As indicated in Figs. 1, 3 and 4, the ends of the flanges of the T-iron guide member are so cut or formed that only the points 19 contact with the faces of the brackets 13 and 14. The faces of the brackets surrounding the apertures 17 are roughened in any suitable manner, as indicated at 20 in Figs. 2 and 5.

With the aforesaid construction a three-point contact is formed between the ends of the guide member 12 and the roughened surface of the faces of the brackets 13 and 14 thus interposing friction means between the ends of the guide member and the supporting brackets. In this manner the guide member is prevented from any turning movement in relation to the brackets and it may be securely fixed in any desired angular relation to the brackets for purposes hereinafter described.

A carrier 21 is slidably mounted in the T-iron guide member. The carrier comprises a yoke 22 between the free ends of which is supported a pulley 23 which engages the guide member. Secured to or formed integral with the outer end of the yoke is a hook 24 which carries one of the pulleys 25 of a clothes-line 26, the other pulley 27 being secured in the usual manner to a pole 28.

It often happens, particularly in congested areas, the pole 28, or point of support for the pulley 27, is at various angles from where it may be desired to position the guide member 12. One of the most important aspects of the present invention is the fact that this condition may be compensated for by adjusting the angular relation of the guide members to the brackets, as heretofore described. A rigid substantial structure is thus created and one that will always be efficient in operation, regardless of weather conditions. A reasonable amount of clearance is left between the sides 22 of the yoke to permit of play between the carrier and guide member and prevent any possibility of binding when the carrier is being raised or lowered. Obviously the weight of the clothes-line and the clothes on the line will always maintain the roller 23 in contact with the guide member.

Means are provided for raising and lowering the carrier. A pair of ears, 29—30 are formed on the yoke 22 of the carrier and to these ears the ends of a cable 31 are attached. The cable 31 passes over a pulley 32 suspended from a bracket 33 secured to the upper part of the guide member and has attached thereto clips 34 and 35 having eyes 36. Any suitable number of clips may be employed, depending upon how many positions one may wish to fix the carrier at. The eyes 36 of the clip co-operate with a stationary hook 37 in the wall of the building.

In the full line position of Fig. 1 the carrier is shown at the bottom of the guide member. In this position the clothes may be hung on the line from the ground and the line then elevated to any desired height to prevent the clothes from dragging or interfering with anything passing by. If it is desired to hang the clothes from the window the carrier is raised to a height about even with the lower part of the window opening 11 and after the clothes have been hung it may then be raised to the position indicated in broken lines in Fig. 1.

From the foregoing it is thought to be apparent that a clothes-line elevating device has been provided in which features of rugged construction, efficient operation and economy of manufacture are displayed.

Changes and alterations in details of construction may be made without departing from the spirit of the invention, as expressed in the appended claims.

I claim:

1. A clothes-line elevating device having in combination, a T-iron guide member, brackets supporting the upper and lower ends of said T-iron guide member, threaded extensions on the ends of said T-iron guide member, said extensions projecting through apertures in said brackets and secured therein, a carrier slidably mounted on said T-iron guide member, means for raising and lowering said carrier, and means for attaching a clothes-line to said carrier.

2. A clothes-line elevating device having in combination, a T-iron guide member, brackets supporting the upper and lower ends of said T-iron guide member, friction means between the ends of said T-iron member and said brackets, threaded extensions on the ends of said T-iron guide members, said extensions extending through apertures in said brackets, nuts co-operating with said T-iron guide member, a carrier, a pulley supported on said carrier and engaging said T-iron guide member, means for raising and lowering said carrier and a hook on said carrier to which a clothes-line may be attached.

3. A clothes-line elevating device having in combination, a T-iron guide member, brackets supporting the upper and lower ends of said T-iron guide member, threaded extensions on the ends of said T-iron guide member, said extensions projecting through apertures in said brackets and secured therein, a carrier slidably mounted in said T-iron guide member, means for attaching a clothes-line to said carrier, a cable for raising and lowering said carrier, eyes clamped to said cable, and a hook to which said eyes may be secured for positioning said carrier.

In testimony whereof I affix my signature.

FREDERICK MENNINGHAUS.